United States Patent
Shores

[11] Patent Number: 5,890,525
[45] Date of Patent: Apr. 6, 1999

[54] INFLATABLE CAR COVER AND METHOD OF COVERING

[76] Inventor: Rudolph A Shores, 4629 Edwards Rd., Alma, Ark. 72921

[21] Appl. No.: 778,753

[22] Filed: Jan. 6, 1997

[51] Int. Cl.$^6$ .................................................. B65D 65/02
[52] U.S. Cl. ........................... 150/166; 206/522; 296/136
[58] Field of Search .................................... 150/166, 167; 383/3; 296/136; 206/522

[56] References Cited

U.S. PATENT DOCUMENTS

| | | | |
|---|---|---|---|
| 4,044,867 | 8/1977 | Fisher | 383/3 X |
| 4,209,197 | 6/1980 | Fischer | 296/136 X |
| 4,294,483 | 10/1981 | Ferris | 296/136 |
| 4,384,602 | 5/1983 | Ores | 383/3 X |
| 4,826,329 | 5/1989 | Bellini | 383/3 |
| 5,242,206 | 9/1993 | Heck | 150/166 X |
| 5,287,904 | 2/1994 | Smith et al. | 150/166 |
| 5,350,000 | 9/1994 | Wang | 150/166 |
| 5,351,829 | 10/1994 | Batsford | 383/3 X |
| 5,497,819 | 3/1996 | Chiang | 150/166 |

FOREIGN PATENT DOCUMENTS

| | | | |
|---|---|---|---|
| 3928695 | 3/1991 | Germany | 296/136 |
| 4400392 | 6/1994 | Germany | 296/136 |
| 4316504 | 11/1994 | Germany | 296/136 |
| 58-101822 | 6/1983 | Japan | 296/136 |
| 398421 | 2/1974 | U.S.S.R. | 296/136 |
| 893600 | 12/1981 | U.S.S.R. | 296/136 |

*Primary Examiner*—Sue A. Weaver
*Attorney, Agent, or Firm*—Michael I. Kroll

[57] ABSTRACT

An inflatable car cover (10) comprising a covering (12) having a plurality of channel supported air pockets (14) to fit over an exterior finish (16) of a car (18). A plurality of restraint straps (20) are provided. Each restraint strap (20) has a channel supported air pocket (22) fluidly attached at a first end (24) to a first lower edge (26) of the covering (12). A component (28) is for inflating all of the channel supported air pockets (14) within the covering (12) and all of the channel supported air pockets (22) in the restraint straps (20). A structure (30) is for attaching a second end (32) of each restraint strap (20) to an opposite second lower edge (34) of the covering (12) under the car (18), to hold the covering (12) in place upon the exterior finish (16) of the car (18). This will protect the exterior finish (16) of the car (18) from the elements, such as damaged caused by rain, sun and leaves, as well as protection from falling debris, such as acorns, hail, branches and stones.

7 Claims, 5 Drawing Sheets

COMPARTMENTAL EMBODIMENT

INFLATABLE CAR COVER AND METHOD OF COVERING

BACKGROUND OF THE INVENTION

1. Field of the Invention

The instant invention relates generally to car covers and more specifically it relates to an inflatable car cover.

The conventional car cover is a fitted fabric that normally protects the finish of the car from wind-blown dust, rain, snow, ice, sun, salt spray, tree sap, smog, bird droppings and airborne pollutants. The conventional car cover will not protect the car from falling debris, such as acorns, hail, branches and stones.

2. Description of the Prior Art

Numerous car covers have been provided in prior art. For example, U.S. Pat. No. 4,093,302 to Adams; 4,294,483 to Ferris; 5,242,206 to Heck; 5,287,904 to Smith et al.; 5,350,000 to Wang and Des. 321,254 to Harp all are illustrative of such prior art. While these units may be suitable for the particular purpose to which they address, they would not be as suitable for the purposes of the present invention as heretofore described.

SUMMARY OF THE INVENTION

A primary object of the present invention is to provide an inflatable car cover that will overcome the shortcomings of the prior art devices.

Another object is to provide an inflatable car cover that will protect the exterior finish of a car from the elements, such as damage caused by rain, sun and leaves, as well as protection from falling debris, such as acorns, hail, branches and stones.

An additional object is to provide an inflatable car cover that places a cushion of air between the exterior finish of the car and the elements, by creating a plurality of channel supported air pockets that are inflated via a sealable air valve stem, in which the air pockets are retained over the exterior finish of the car by inflated restraint straps fastened under the car.

A further object is to provide an inflatable car cover that is simple and easy to use.

A still further object is to provide an inflatable car cover that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 8 is an exploded top perspective view of a second embodiment of the instant invention per se.

Similar reference characters denote corresponding features consistently throughout the attached drawings.

DETAILED DESCRIPTION OF THE PREFERRED EMBODIMENTS

Figure 1:
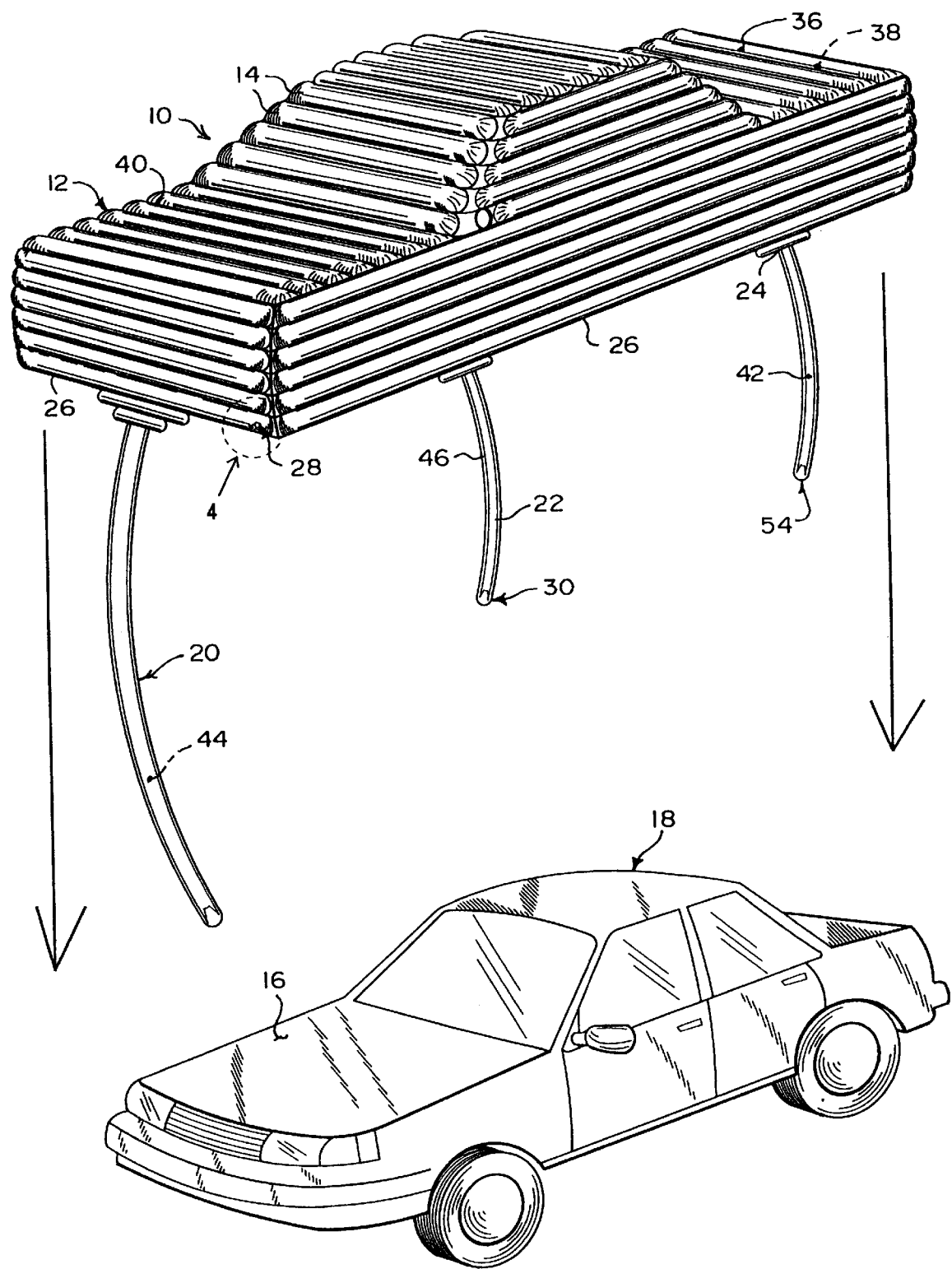
FIG. 1 is a top perspective view of a first embodiment of the instant invention ready to be installed upon an exterior finish of a car.

Turning now descriptively to the drawings, in which similar reference characters denote similar elements throughout the several views, FIGS. 1 to 8 illustrate an inflatable car cover 10 comprising a covering 12 having a plurality of channel supported air pockets 14 to fit over an exterior finish 16 of a car 18. A plurality of restraint straps 20 are provided. Each restraint strap 20 has a channel supported air pocket 22, fluidly attached at a first end 24 to a first lower edge 26 of the covering 12.

A component 28 is for inflating all of the channel supported air pockets 14 within the covering 12 and all of the channel supported air pockets 22 in the restraint straps 20. A structure 30 is for attaching a second end 32 of each restraint strap 20 to an opposite second lower edge 34 of the covering 12 under the car 18, to hold the covering 12 in place upon the exterior finish 16 of the car 18. This will protect the exterior finish 16 of the car 18 from the elements, such as damaged caused by rain, sun and leaves, as well as protection from falling debris, such as acorns, hail, branches and stones.

The covering 12 includes two layers of durable and resilient plastic material 36, 38 possessing lightweight physical properties necessary to assure integrity of an air support system, to make up the channel supported air pockets 14. A facility 40 is for fusing together the two layers 36, 38 to form the channel supported air pockets 22 of the covering 12, to prevent air leakage therefrom.

Each restraint strap 20 consists of two layers of durable and resilient plastic material strips 42, 44 possessing lightweight physical properties necessary to assure integrity of an air support system, to make up said channel supported air pocket 20. A facility 46 is for fusing together the two layers 42, 44 to form the channel supported air pocket 22 of the restraint strap 20, to prevent air leakage therefrom.

The inflating component 28 is an air valve stem 48 fluidly connected into the covering 12. The air valve stem 48 includes a cap 50 connected thereto. The cap 50 can seal the air valve stem 48 after the covering 12 and the restraint straps 20 are inflated.

Figure 2:
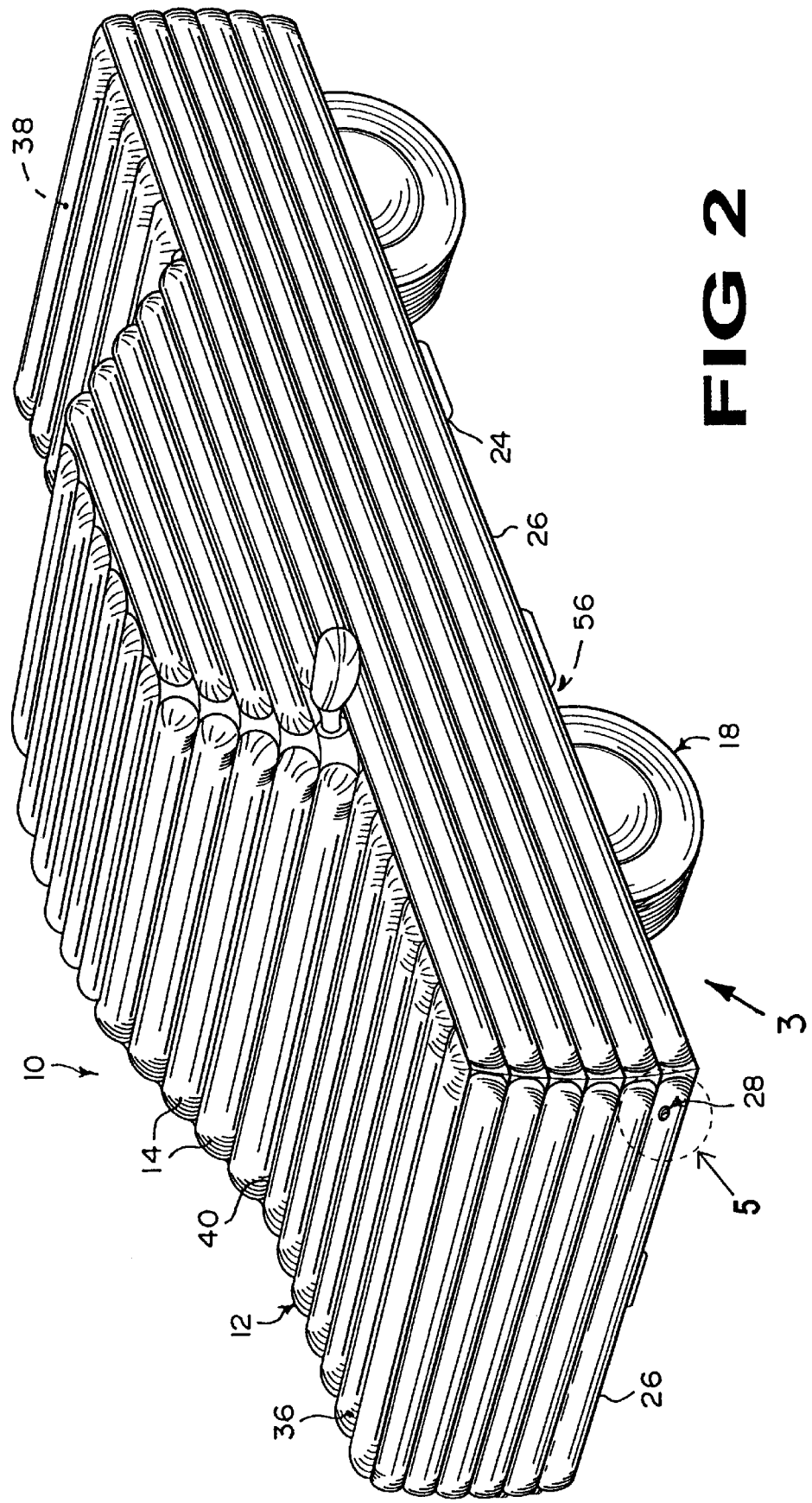
FIG. 2 is a top perspective view, showing the first embodiment installed upon the exterior finish of the car.
Figure 3:
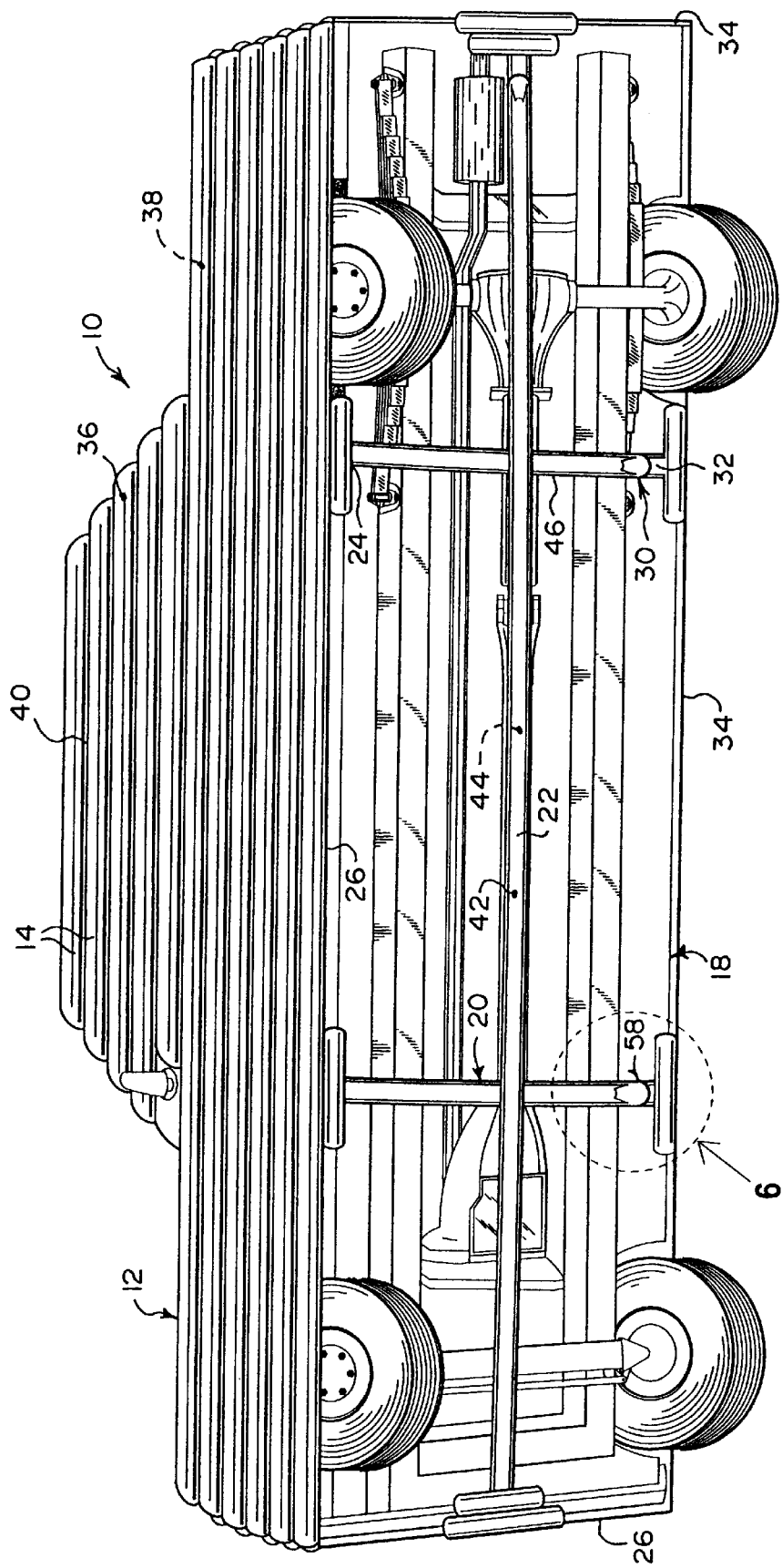
FIG. 3 is a bottom perspective view taken in the direction of arrow 3 in FIG. 2.
Figure 4:
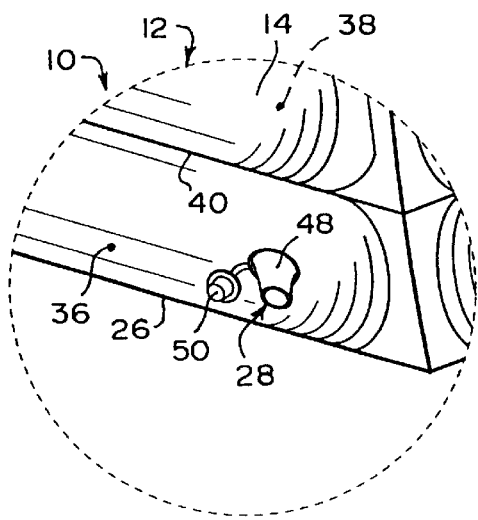
FIG. 4 is an enlarged perspective view of the area indicated by arrow 4 in FIG. 1, showing the air valve stem opened.
Figure 6:
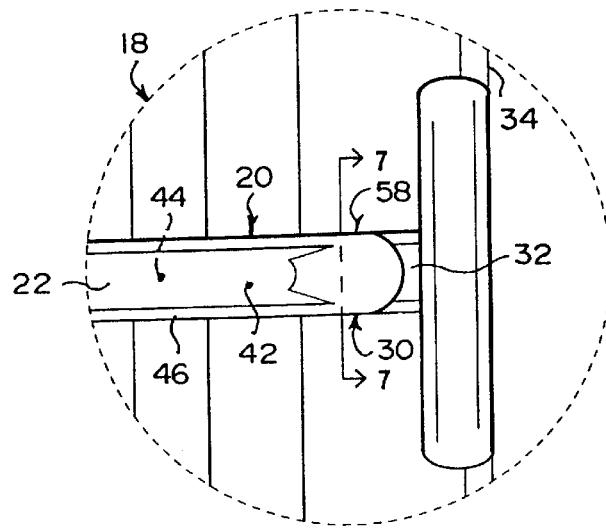
FIG. 6 is an enlarged perspective view of the area indicated by arrow 6 in FIG. 3, showing one of the restraint straps secured.
Figure 5:
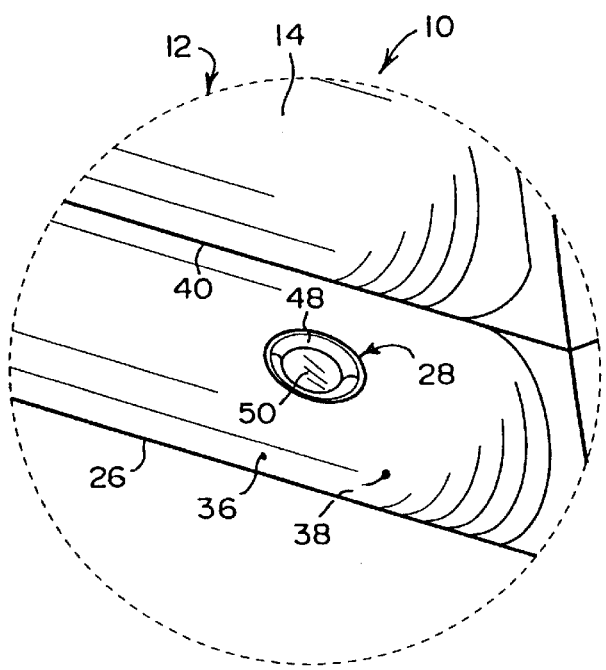
FIG. 5 is an enlarged perspective view of the area indicated by arrow 5 in FIG. 2, showing the air valve stem closed with the cap.
Figure 7:
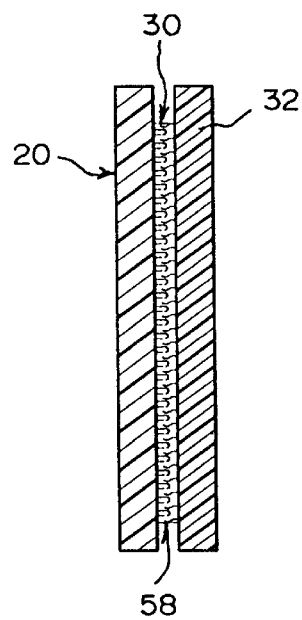
FIG. 7 is a further enlarged cross sectional view taken along line 7—7 in FIG. 6, showing a VELCRO fastener assembly.
Figure 6:
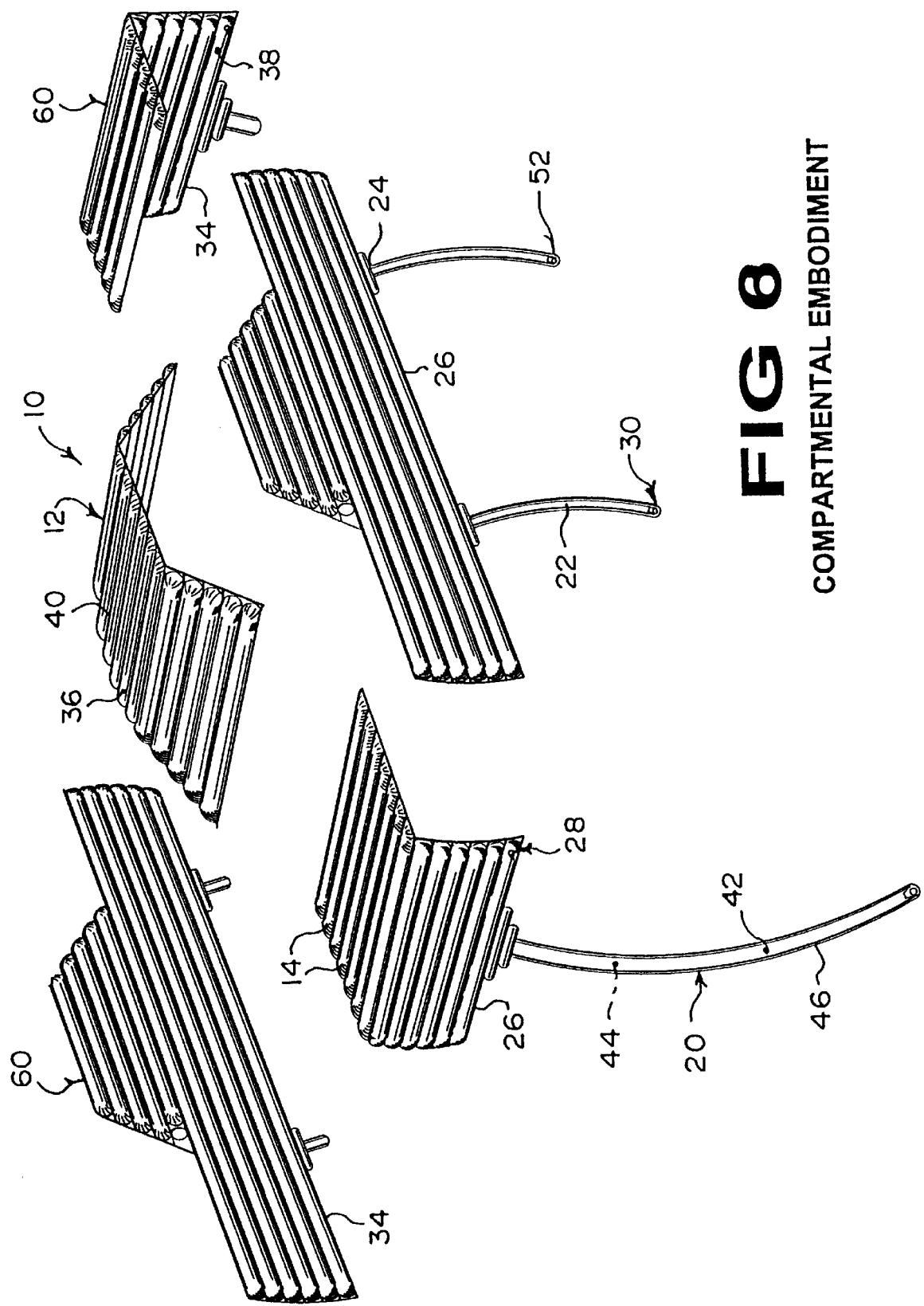

The fusing facility 40, 46 for the two layers 36, 38 of the covering 12 and the two layers 42, 44 of each restraint strap 20 can be done by ultrasonic welding, chemical adhesion or by an application of a sizing solution and heat. The attaching structure 30 for each restraint strap 20 can be a snap fastener assembly 52 as shown in FIG. 8, a hook fastener assembly 54 as shown in FIG. 1, a loop closure assembly 56 as indicated in FIG. 2 or a VELCRO fastener assembly 58 as shown in FIGS. 3, 6 and 7.

FIG. 8 shows the covering 12 divided into a plurality of independent inflatable zones 60. In the event of a puncture of one of the inflatable zones 60, the covering are 12 will not totally deflate, since the inflatable zones 60 separately isolated from each other.

OPERATION OF THE INVENTION

To use the inflatable car cover 10, the following steps should be taken:

1. Place the covering 12 upon the exterior finish 16 of the car 18.
2. Inflate the covering 12 and the restraint straps 20 through the air valve stem 48 by a compressor or hand pump.
3. Seal the cap 50 on the air valve stem 48.
4. Affix the second end 32 of each restraint strap 20 to the opposite second lower edge 34 of the covering 12 under the car 18 with an attaching structure 30.
5. Make sure that the covering 12 is in it's proper position, so that all of the channel supported air pockets 14 will protect the exterior finish 16 of the car 18 from the elements, as well as from falling debris.

LIST OF REFERENCE NUMBERS

| | |
|---|---|
| 10 | inflatable car cover |
| 12 | covering of 10 |
| 14 | channel supported air pocket of 12 |
| 16 | exterior finish of 18 |
| 18 | car |
| 20 | restraint strap of 10 |
| 22 | channel supported air pocket of 20 |
| 24 | first end of 22 |
| 26 | first lower edge of 12 |
| 28 | inflating component of 10 |
| 30 | attaching structure of 10 for 20 |
| 32 | second end of 20 |
| 34 | opposite second lower edge of 12 |
| 36 | first layer of durable and resilient plastic material of 12 |
| 38 | second layer of durable and reilient plastic material of 12 |
| 40 | fusing facility of 12 |
| 42 | first layer of durable and resilient plastic material of 20 |
| 44 | second layer of durable and resilient plastic material of 20 |
| 46 | fusing facility of 20 |
| 48 | air valve stem for 28 |
| 50 | cap on 48 |
| 52 | snap fastener assembly for 30 |
| 54 | hook fastener assembly for 30 |
| 56 | loop closure assembly for 30 |
| 58 | VELCRO fastener assembly for 30 |
| 60 | independent inflatable zone in 12 |

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An inflatable car cover comprising:
   a) a covering having a plurality of channel supported air pockets to fit over and completely cover the exterior finish of a car formed by two layers of resilient plastic material and means for fusing together said two layers to form said channel supported air pockets of said covering to prevent air leakage therefrom;
   b) a plurality of restraint straps, with each said restraint strap having a channel supported air pocket fluidly attached at a first end to a first lower edge of said covering, said straps being formed by two layers of resilient plastic material strips and means for fusing together said two layers to form said channel supported air pocket of said restraint strap to prevent air leakage therefrom;
   c) means comprising an air valve stem with a cap fluidly connected into said covering for inflating all of said channel supported air pockets within said covering and all of said channel supported air pockets in said restraint straps;
   d) means for attaching a second end of each said restraint strap to an opposite second lower edge of said covering under the car, to hold said covering in place upon the exterior finish of the car, thereby protecting the exterior finish of the car from the elements, such as damaged caused by rain, sun and leaves, as well as protection from falling debris, such as acorns, hail, branches and stones; and
   e) one of said straps being attached at said first end to one end of said car and the remaining straps being attached at the first ends thereof to a side of said car, said straps extending under said car with said one of said straps crossing the remaining straps under said car.

2. An inflatable car cover as recited in claim 1, wherein said attaching means for each said restraint strap is a snap fastener assembly.

3. An inflatable car cover as recited in claim 1, wherein said attaching means for each said restraint strap is a hook fastener assembly.

4. An inflatable car cover as recited in claim 1, wherein said attaching means for each said restraint strap is a loop closure assembly.

5. An inflatable car cover as recited in claim 1, wherein said attaching means for each said restraint strap is a hook and loop fastener assembly.

6. An inflatable car cover as recited in claim 1, wherein said covering is divided into a plurality of independent inflatable zones, so that in the event of a puncture of one of said inflatable zones said covering will not totally deflate, since said inflatable zones are separately isolated from each other.

7. The method of covering a car to protect said car from the elements and falling debris comprising the steps of:
   a) placing over said car a covering having a plurality of channel supported air pockets formed by two layers of resilient plastic material fused together to form said channel supported air pockets to prevent air leakage therefrom, a plurality of restraint straps with each said restraint strap having a channel supported air pocket fluidly attached at a first end to a first lower edge of said covering, said straps being formed by two layers of resilient plastic material strips fused together to form said channel supported air pocket to prevent air leakage therefrom, an air valve stem with a cap fluidly connected into said covering for inflating all of said channel supported air pockets within said covering and restraint straps, and a second end of each said restraint strap having means for attaching each said second end to an opposite lower edge of said covering, one of said straps being attached at its first end to an end of said car and the remaining straps being attached at the first ends thereof to a side of said car;

b) inflating said covering and straps through said air valve;

c) sealing said cap on said air valve; and d) attaching the second ends of said straps to the opposite sides of said car by running said straps under said car, said straps extending under said car with said one of said straps crossing the remaining straps under said car.

* * * * *